United States Patent [19]
Suzuki

[11] Patent Number: 6,133,896
[45] Date of Patent: Oct. 17, 2000

[54] ANTIFERROELECTRIC LIQUID CRYSTAL CELL

[75] Inventor: Yasushi Suzuki, Tokorozawa, Japan

[73] Assignee: Citizen Watch Co., Ltd., Tokyo, Japan

[21] Appl. No.: 09/155,713

[22] PCT Filed: Feb. 5, 1998

[86] PCT No.: PCT/JP98/00482

§ 371 Date: Oct. 5, 1998

§ 102(e) Date: Oct. 5, 1998

[87] PCT Pub. No.: WO98/35265

PCT Pub. Date: Aug. 13, 1998

[30] Foreign Application Priority Data

Feb. 7, 1997 [JP] Japan ................................. 9-024583

[51] Int. Cl.[7] .................................................. G09G 3/36
[52] U.S. Cl. .................................... 345/97; 349/174
[58] Field of Search ......................... 345/97, 94, 95, 345/98, 99, 204, 208–210; 349/174, 172, 171

[56] References Cited

U.S. PATENT DOCUMENTS

| | | | |
|---|---|---|---|
| 5,367,391 | 11/1994 | Johno et al. | 345/97 |
| 5,555,110 | 9/1996 | Konuma et al. | 345/97 |
| 5,615,026 | 3/1997 | Koden | 349/174 |
| 5,739,804 | 4/1998 | Okumura et al. | 345/99 |
| 5,838,293 | 11/1998 | Kondoh | 345/97 |
| 5,963,187 | 10/1999 | Tanaka et al. | 345/97 |
| 6,040,889 | 3/2000 | Takatori et al. | 349/174 |

FOREIGN PATENT DOCUMENTS 2-222930  9/1990  Japan .

*Primary Examiner*—Regina Liang
*Attorney, Agent, or Firm*—Finnegan, Henderson, Farabow, Garrett & Dunner, L.L.P.

[57] ABSTRACT

The invention relates to an improvement in the contrast of an antiferroelectric liquid crystal cell which is constructed with an antiferroelectric liquid crystal sandwiched between a pair of substrates. The antiferroelectric liquid crystal cell has a layer structure such that when a Fourier transform is applied to an output voltage produced as a result of the application of a sinusoidal voltage as a reference frequency to the liquid crystal cell, the transformed output voltage contains frequency components at odd and even multiples of the reference frequency, and the optical path length of the liquid crystal cell lies in the range of 100 nm to 800 nm.

1 Claim, 12 Drawing Sheets

ANTIFERROELECTRIC LIQUID CRYSTAL CELL

TECHNICAL FIELD

The present invention relates to a liquid crystal cell used in a liquid crystal display or the like. More particularly, the invention relates to an antiferroelectric liquid crystal cell using an antiferroelectric liquid crystal and having good display qualities.

BACKGROUND ART

A feature of antiferroelectric liquid crystal (hereinafter referred to as AFLC) is that it possesses a large spontaneous polarization Ps compared with other liquid crystal materials. It is known that, in an antiferroelectric liquid crystal cell constructed with AFLC sandwiched between a pair of substrates, AFLC molecules are arranged in layers in the absence of an applied voltage, and whose structure is such that the spontaneous polarization is canceled between each layer. The AFLC material, which was discovered in 1988, was initially introduced as a material that can provide a mode that does not cause burn-in, a phenomenon in which information written before a voltage application persists on a liquid crystal panel, as compared with using the traditional nematic liquid crystal. Since then, development of antiferroelectric liquid crystal panels has proceeded in order to utilize this property of AFLC. Research effort so far has been directed to the development of materials having a large spontaneous polarization Ps and to blending techniques for such materials, to retain fast response and, consequently, the response characteristic has been improved greatly. However, among other characteristics, the contrast, which is the ratio of light transmittance between white display and black display states, still leaves much to be desired.

DISCLOSURE OF THE INVENTION

Accordingly, an object of the present invention is to provide an antiferroelectric liquid crystal cell that has good display qualities by improving the contrast while retaining the fast response and wide viewing angle characteristics of the AFLC mode. It is also an object of the invention to facilitate the fabrication of the liquid crystal cell.

To achieve the above objects, according to the present invention, there is provided an antiferroelectric liquid crystal cell constructed with an antiferroelectric liquid crystal sandwiched between a pair of substrates, wherein the antiferroelectric liquid crystal cell has a layer structure such that when a sinusoidal voltage, as a reference frequency, is applied across the liquid crystal cell and the produced output signal is Fourier transformed, the transformed output voltage contains frequency components at odd and even multiples of the reference frequency, and wherein the optical path length of the liquid crystal cell lies in the range of 100 nm to 800 nm.

ADVANTAGEOUS EFFECTS OF THE INVENTION

According to the present invention, it is possible provide an antiferroelectric liquid crystal panel which, in both the antiferroelectric and ferroelectric phases, (1) retains the fast response characteristic,
(2) retains the feature of wide viewing angle,
(3) has improved contrast, and
(4) is easy to fabricate.

BRIEF DESCRIPTION OF THE DRAWINGS

FIGS. 10($a$) and ($b$) are diagrams showing the layer structures, in cross section, of liquid crystal cells.

FIGS. 11($a$) and 11($b$) are diagrams showing the layer structures, in cross section, in liquid crystal cells.

FIGS. 12($a$) and 12($b$) are diagrams showing laminated structures in optically anisotropic members.

DETAILED DESCRIPTION OF THE INVENTION

In one method of arranging polarizing plates in a display that drives an antiferroelectric liquid crystal cell, a pair of polarizing plates, of which the polarizing axes are in a crossed Nicol configuration to each other, sandwich the antiferroelectric liquid crystal cell, and the polarization axis of one polarizing plate is so set as to substantially coincide with the average direction of AFLC molecules in the absence of an applied voltage. By so arranging the polarization plates, an antiferroelectric liquid crystal panel can be obtained that produces a black display when no voltage is applied and a white display when a voltage is applied. The feature of the drive mode using the AFLC is that it has (1) an antiferroelectric phase as a stable state and (2) a ferroelectric state as a metastable state, and phase transitions between these two phases are utilized. Producing a white display on an AFLC panel means causing a phase transition from the antiferroelectric state to the ferroelectric state by applying a voltage.

For panels using ferroelectric liquid crystals, parameters such as the amount of spontaneous polarization Ps and electrical conductivity σ have been used as criteria for evaluating the display quality. The inventor conducted a study focusing on these parameters. To further clarify their relationships, the inventor measured electrical permittivity, considering harmonics, and studied the relationships between liquid crystal characteristics.

The principle means for measuring the electrical permittivity has been known for a long time, and examples of analyzing the electrical permittivity of ferroelectric liquid crystal or that of AFLC, in particular, by considering harmonic components, have been reported in papers presented, for example, by a group of Kimura and Hayakawa (e.g., Jpn. J. Appl. Phys 32, (1993) 4571 Liq. Cryst., 14 (1993) 427) or a group of Orihara and Ishibashi (e.g., J. Phys. Soc. Jpn, 64 (1995) 3188 Solid-State Physics 31 (1996) 459). The feature of this technique is that a single-frequency sinusoidal voltage is applied to a ferroelectric liquid crystal or an AFLC and the fundamental and harmonic components of the voltage output at this time are measured and analyzed. Both of the groups made measurements on regions where the liquid crystal cell was thick. However, the analysis was made primarily on odd-ordered harmonics, and no studies were made on even-ordered harmonics. In view of this situation, the inventors conducted experiments aiming at extracting factors that determined the panel characteristics, by paying attention to both odd- and even-ordered harmonics. A method of measuring the electrical permittivity will be described in detail below, together with its principle.

When the waveform of an output voltage obtained when an AC voltage as an input voltage is applied to a sample is considered, there are two methods of evaluating the waveform of the output voltage: one method is by observing the measured results along the time axis, and the other by observing the results in the frequency domain. In these two methods, the time axis can be transformed to the frequency axis or vice versa, by applying a certain transform. This transform is implemented using a Fourier transform and, as a method for performing this transform at very high speed, a fast Fourier transform (FFT) is known.

Figure 1:
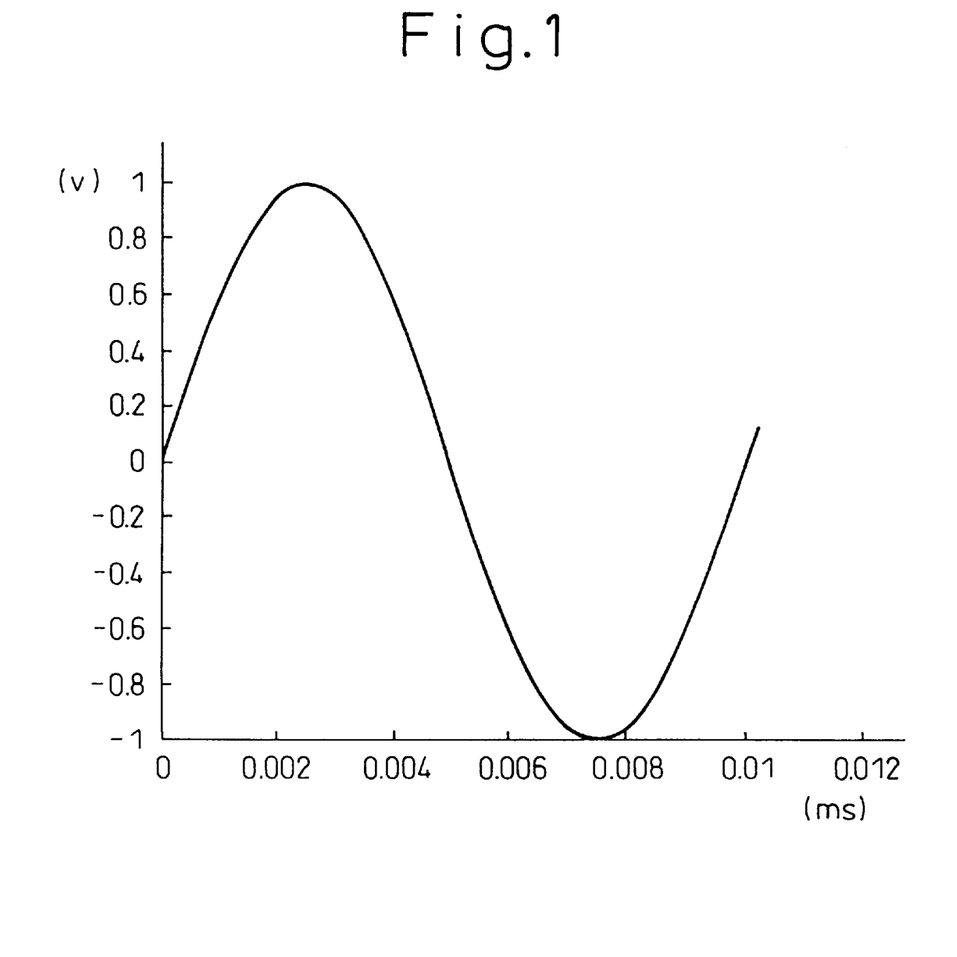
FIG. 1 is a diagram showing a voltage waveform for explaining the present invention.
Figure 2:
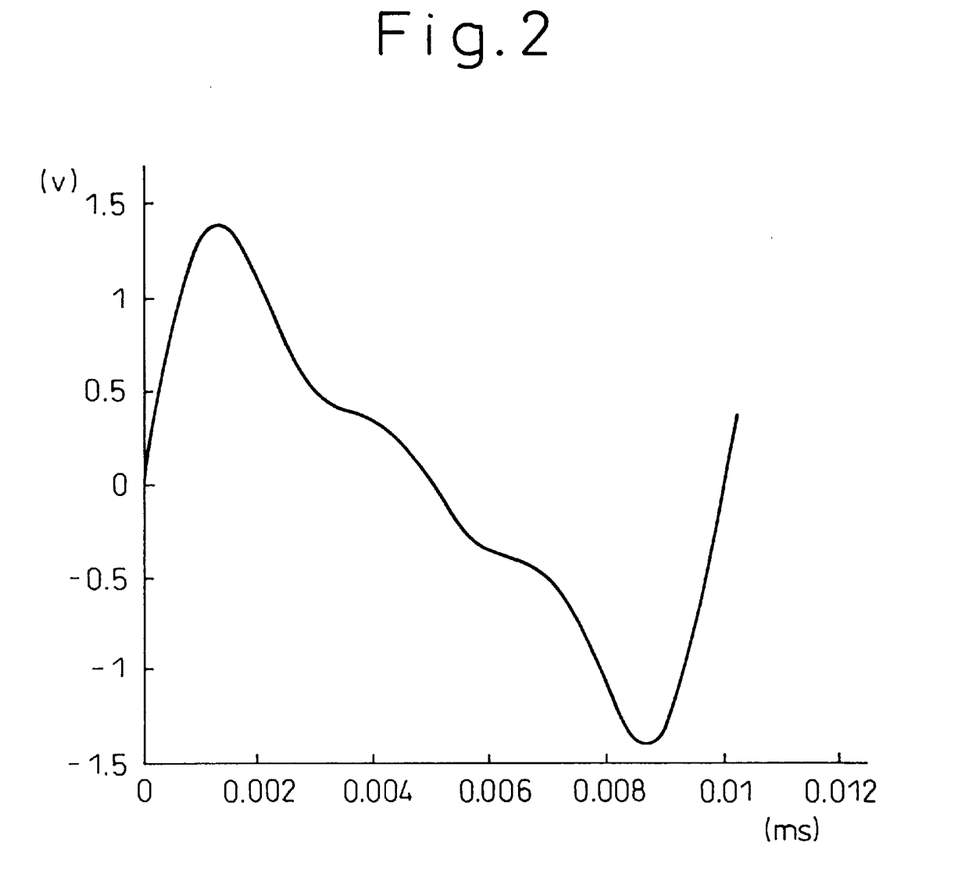
FIG. 2 is a diagram showing a voltage waveform for explaining the present invention.
Figure 3:
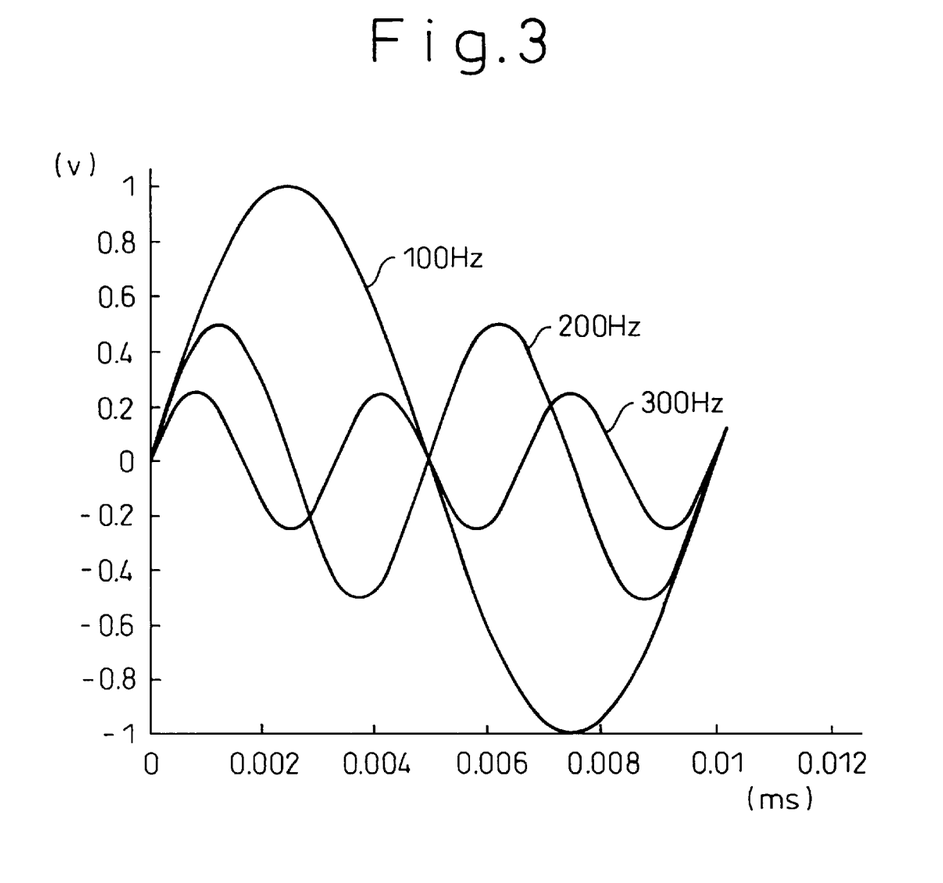
FIG. 3 is a diagram showing voltage waveforms for explaining the present invention.
Figure 4:
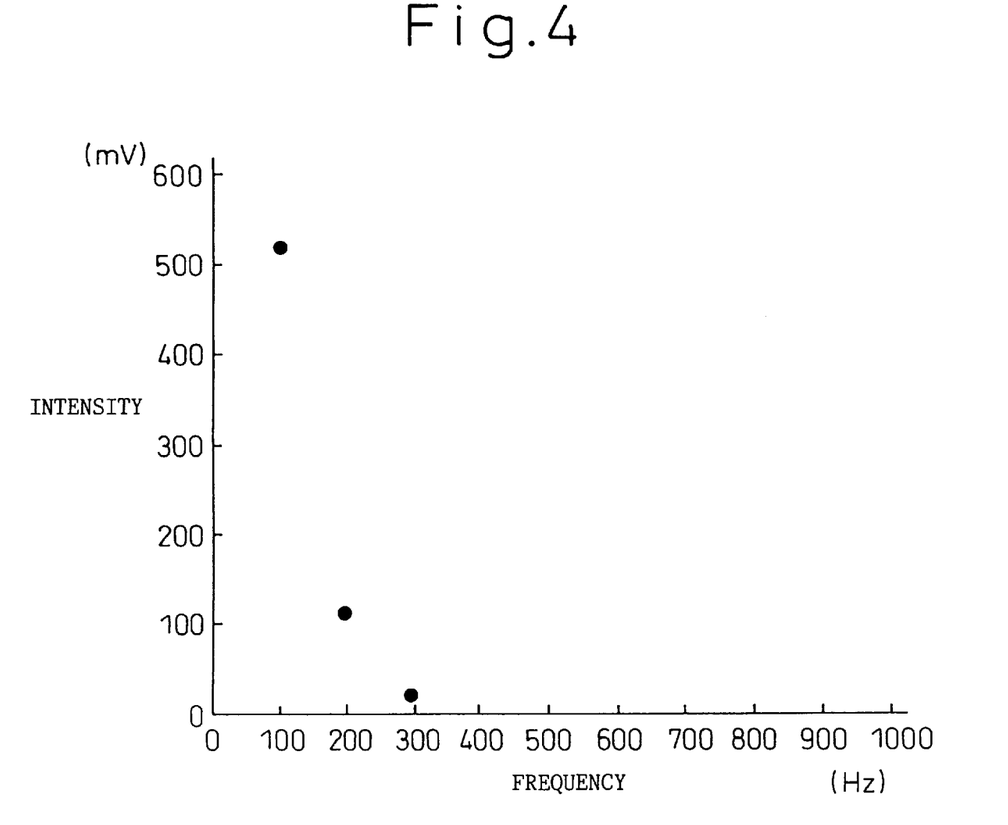
FIG. 4 is a diagram showing harmonic components for explaining the present invention.

FIG. 1 schematically illustrates the waveform of an input voltage (a sinusoidal waveform of 100 Hz drive frequency) plotted along the time axis, and FIG. 2 schematically illustrates the waveform of an output voltage measured along the time axis when the input voltage shown in FIG. 1 was applied to a sample. If one just looks at the waveform of the output voltage in FIG. 2, one does not know how many kinds of waveforms the output waveform is made up of. However, if the waveform obtained in the time axis is transformed by FFT, the waveform can be separated into three kinds of voltage waveform components, that is, the fundamental waveform (100 Hz), the waveform of the frequency (200 Hz) twice the fundamental, and the waveform of the frequency (300 Hz) three times the fundamental shown in FIG. 3. FIG. 4 is obtained when attention is focused on the frequency and intensity of each of the three voltage waveforms. When the frequency of the input voltage waveform is designated W, the component 2W of the frequency twice the input, the component 3W of the frequency three times the input, and the component NW of the frequency N times the input are respectively called the second harmonic, the third harmonic, and the N-th harmonic.

The principle of the electrical permittivity measurement will be described below. Denoting the electrical permittivity by $\in$, the electric field by E, and the spontaneous polarization by Ps, the electric displacement, D, is expressed by the equation $D = \in E + Ps$ Since the electric displacement, D, is the amount of charge, q, per unit area, the electrical permittivity can be determined by applying the electric field E to a dielectric medium with known area and by measuring the capacitance C at this time.

$D = q = C \cdot V = \in E + Ps$ $\in = q/E - Ps/E$

In the case of AFLC, since the value of the spontaneous polarization Ps is infinitely close to zero when the applied voltage is small, the second term on the right-hand side can be regarded as zero. As a result, the electrical permittivity $\in$ is defined as the ratio of the charge q to the electric field E. That is, the electrical permittivity must be measured within the range of the applied voltage where this definition holds. The applied voltage range within which the spontaneous polarization Ps is infinitely close to zero varies depending on the AFLC material; therefore, when measuring the electrical permittivity, the range of the applied voltage within which there is a linear relationship between E and q must be determined for each material that is to be measured.

Figure 5:
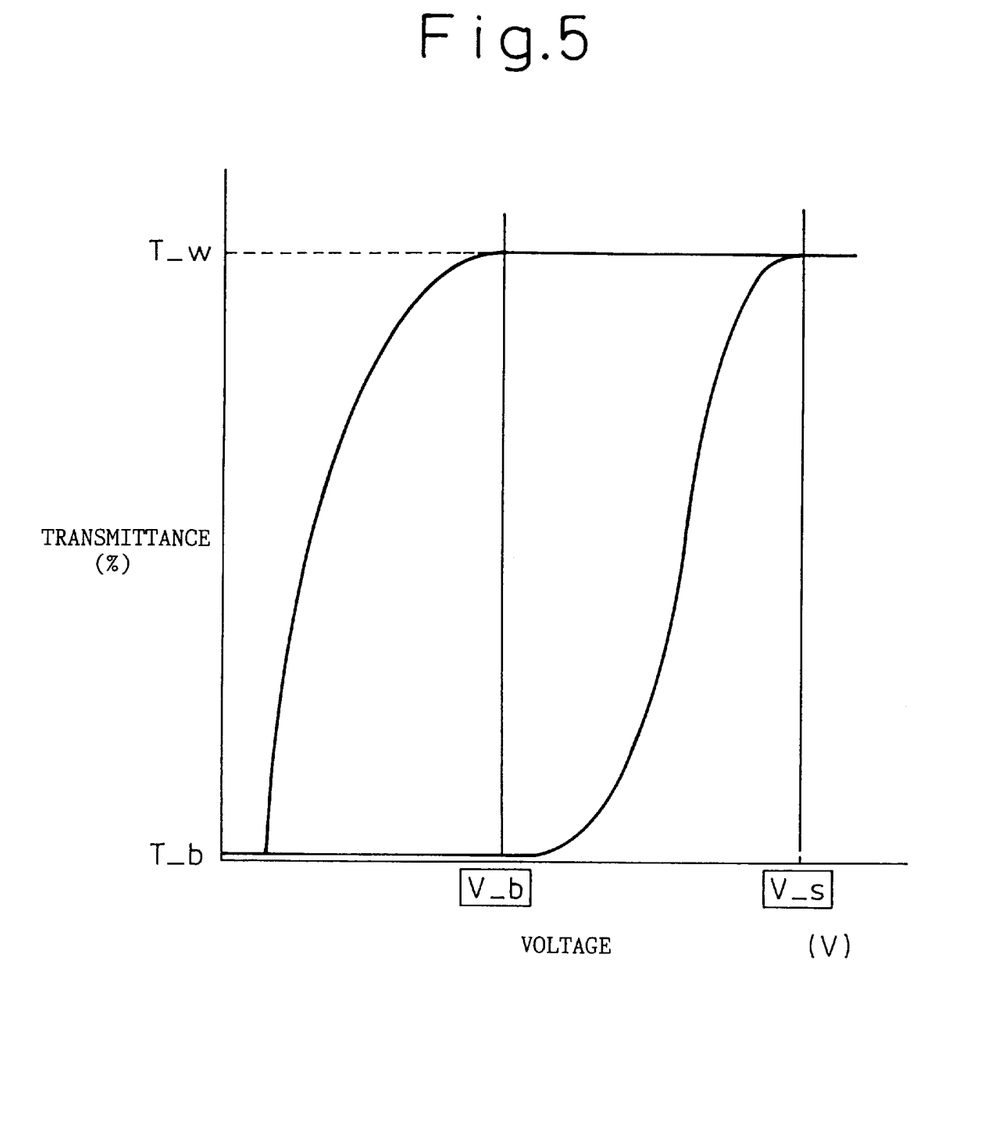
FIG. 5 is a diagram showing the relationship between voltage and transmittance in an antiferroelectric liquid crystal panel.

A method for measuring the AFLC panel characteristics is described in detail in Ferroelectrics (1993, vol. 149, pp. 255). A brief description of the method will be given here with reference to FIG. 5. When a voltage is applied to an AFLC panel, the transmittance of the panel exhibits hysteresis such as shown in FIG. 5 as AFLC molecules undergo phase transitions (molecular reorientation). Specifically, the characteristics of matrix drive panels are determined by a combination of the selection voltage V_s, holding voltage V_b, and the duration of the voltage application. FIG. 5 specifically illustrates the panel's transmittance characteristic when a positive voltage is applied to the liquid crystal, but the panel's transmittance also shows a similar hysteresis characteristic when a negative voltage is applied.

As for the definition of the contrast, the contrast is defined as the ratio of the transmittance T_w (white state) in the ferroelectric state at full voltage application condition to the transmittance T_b (black state) in the antiferroelectric state, i.e., at zero voltage application condition. The contrast ratio is one of the major factors that contribute to enhancing the visibility to the human eye and, as is known, the larger the ratio, the better.

The response time of AFLC consists of the time t (AF→F) for a phase transition from the antiferroelectric phase (AF) to the ferroelectric phase (F) and the time t (F→AF) for a phase transition from the ferroelectric phase (F) to the antiferroelectric phase (AF).

Figure 6:
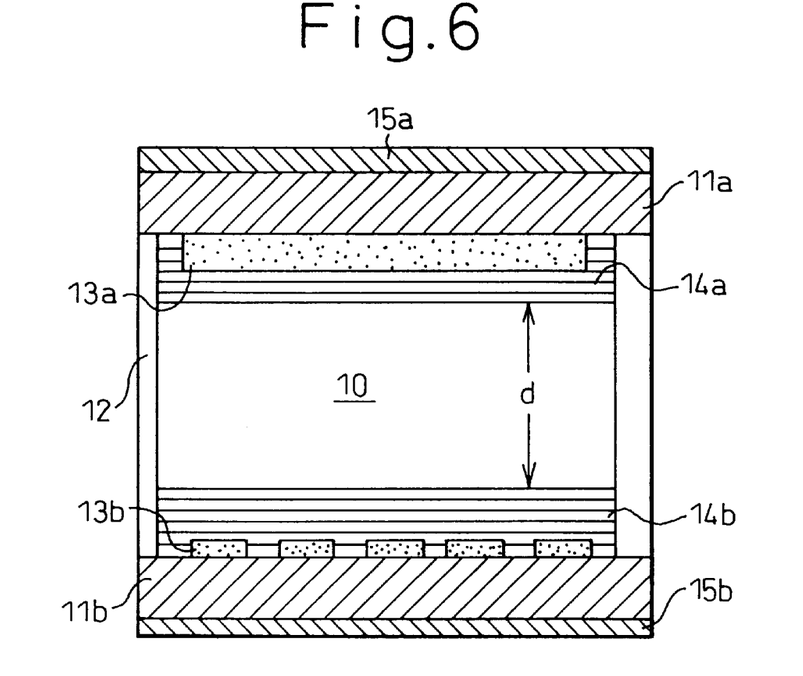
FIG. 6 is a diagram showing the structure of an antiferroelectric liquid crystal cell.

FIG. 6 is a diagram showing the structure of an antiferroelectric liquid crystal cell. In FIG. 6, the liquid crystal cell includes an antiferroelectric liquid crystal layer 10, a pair of glass substrates 11a and 11b, and a sealing material 12 for bonding the glass substrates together. On the opposing surfaces of the glass substrates 11a and 11b are formed electrodes 13a and 13b, which are coated with polymeric alignment films 14a and 14b, respectively. Polarizing plates 15a and 15b are arranged on the outside surfaces of the glass substrates 11a and 11b.

In FIG. 6, d indicates the thickness of the liquid crystal cell. When the difference between the refractive index along the long axis of liquid crystal molecules and that along the short axis thereof (the refractive index anisotropy) is denoted by $\Delta n$, the optical path length is given by the product of the refractive index anisotropy $\Delta n$ and the liquid crystal thickness d, that is, $\Delta n \cdot d$.

[EMBODIMENT]

Figure 7:
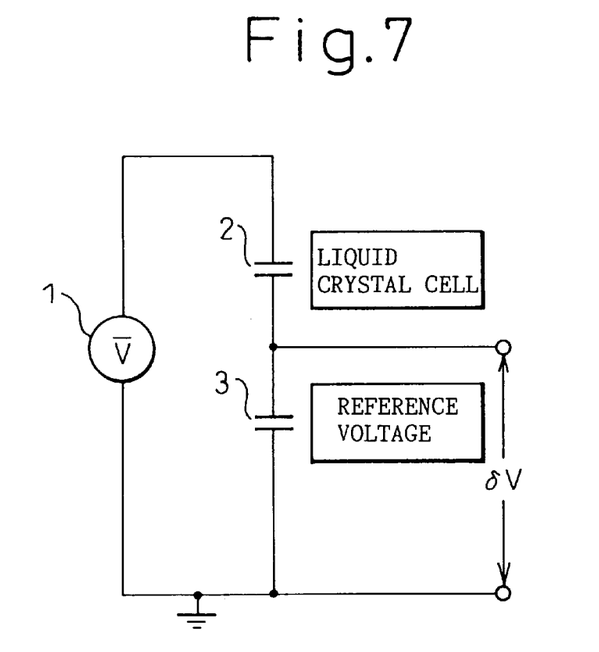
FIG. 7 is a block diagram of a circuit configuration for measuring harmonic components.

A circuit such as shown in FIG. 7 was fabricated in order to apply a single-frequency sinusoidal voltage across an antiferroelectric liquid crystal cell and to measure the fundamental and harmonic wave components of the voltage output at that time. To fabricate the liquid crystal cell used in FIG. 7, polyimide as an alignment film was deposited by spin coating to a thickness of 300 Angstroms on each of two glass substrates, and the two substrates were bonded together. Then, the liquid crystal cell was preheated to about 100° C., and an AFLC material was injected into the liquid crystal cell by using a vacuum injection technique.

After setting the liquid crystal thickness to 1.5 μm and the optical path length to about 220 nm, the liquid crystal cell was arranged as shown in FIG. 7, and the electrical permittivity was measured. In FIG. 7, reference numeral 1 is a power supply having a reference frequency, and the liquid crystal cell 2 and a reference capacitor (Cref) 3 with known capacitance are connected in series to the power supply 1. In this circuit arrangement, a small voltage δv appearing across the reference capacitor 3 was measured. The value of Cref was set to 500 to 1000 times that of the liquid crystal capacitance (CLC) so that most of the applied voltage would be applied to the liquid crystal cell. The charge Δq that flows into the liquid crystal cell at this time is given by Δq=δVCref. Using the power supply 1, a sinusoidal voltage with a constant peak voltage was applied to the liquid crystal cell 2 and, while sequentially varying the reference frequency, the output voltage, ΔV, was measured to measure the variation of the flowing charge Δq. Then, by performing the Fourier transform as earlier described, over one cycle of the output voltage obtained from the variation of the flowing charge Δq, the fundamental and harmonic wave components were analyzed.

Figure 8:
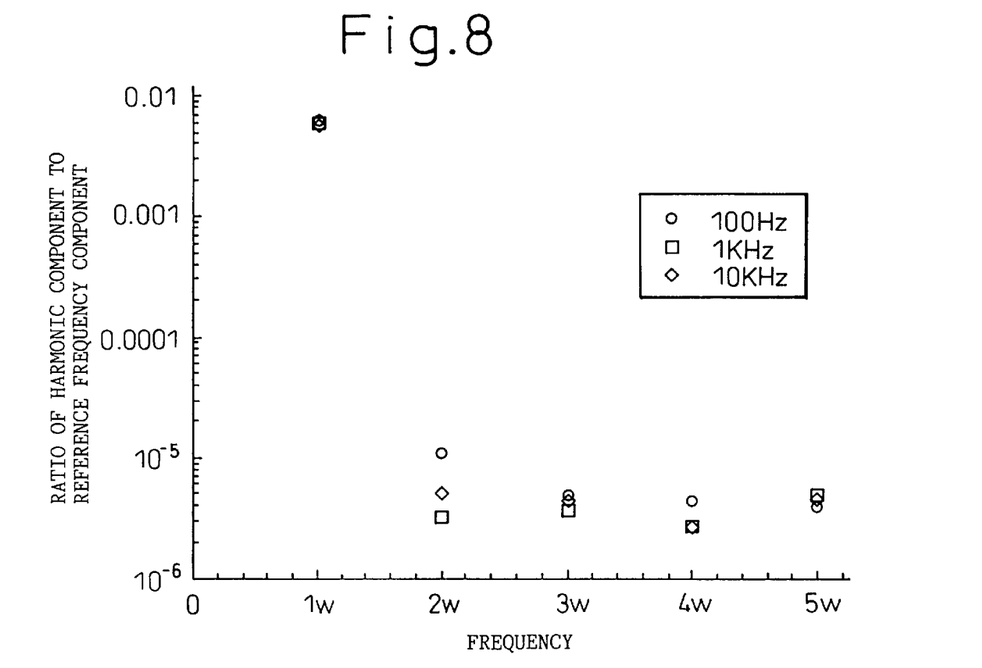
FIG. 8 is a graph showing harmonic components obtained from an antiferroelectric liquid crystal cell according to the present invention.

The intensities of the second harmonic (2W), the third harmonic (3W), the fourth harmonic (4W), and the fifth harmonic (5W) in the output voltage of the liquid crystal cell are shown in FIG. 8. Symbol ○ shows the results when a voltage of 100 Hz frequency was applied as the reference frequency, □ the results when a voltage of 1 KHz frequency was applied as the reference frequency, and ◇ the results when a voltage of 10 KHz frequency was applied as the reference frequency. These results show that in the output voltage of the liquid crystal cell, the frequency components equal to odd multiples (W, 3W, 5W, . . . ) and even multiples (2W, 4W, . . . ) of the reference frequency have respective intensities. Then, the liquid crystal cell that outputs odd- and even-ordered harmonics as just described was actually driven as an AFLC panel for display by applying voltage pulses of 30 V and 100 μs pulse duration. The AFLC panel thus driven had a wide viewing angle, fast response time, and high contrast, thus producing a display of good quality.

COMPARATIVE EXAMPLE 1

Figure 9:
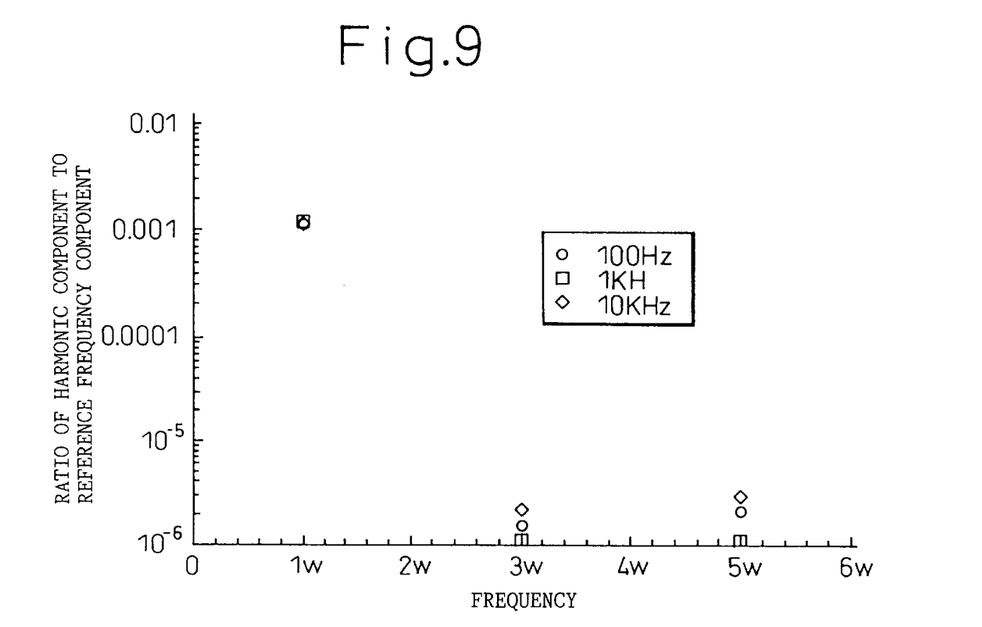
FIG. 9 is a graph showing harmonic components obtained from a comparative example different from the present invention.

The fundamental and harmonic wave components were analyzed in the same manner as in the above embodiment, except that the liquid crystal thickness was controlled to 9 μm and the optical path length was set to about 1320 nm. The results shown in FIG. 9 were obtained for the intensities of the second harmonic (2W), the third harmonic (3W), the fourth harmonic (4W), and the fifth harmonic (5W). In the figure, components lying in the intensity region below $10^{-6}$ plotted along the vertical axis were ignored since they were indistinguishable from noise in view of the measuring accuracy with respect to the background noise. As can be seen from FIG. 9, only the reference frequency (W), the third harmonic (3W), and the fifth harmonic (5W) were observed, and no components were observed at the positions of even multiples of the reference frequency. Voltage pulses of 30 V and 100 μs pulse duration were applied to this liquid crystal cell to actually drive it as an AFLC panel to produce a display, but it was not possible to drive the AFLC; even when the voltage pulses were varied in various ways, no switching occurred, and it was not possible to produce a display.

Figure 10A:
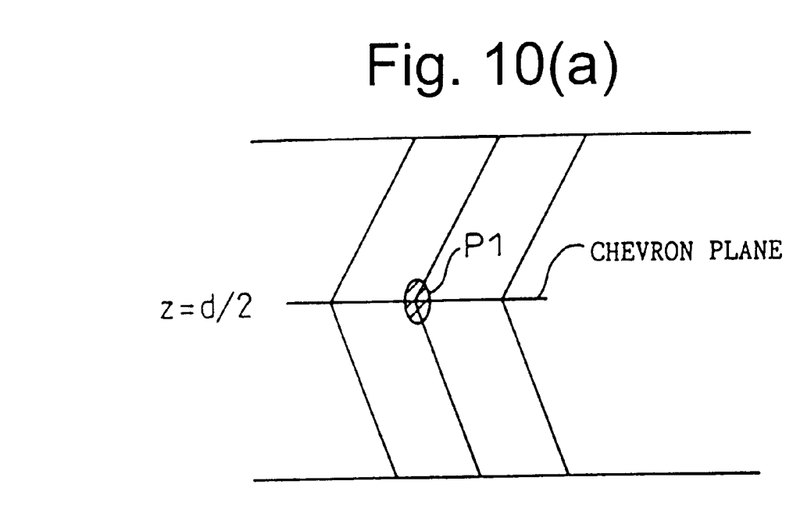
Figure 10B:
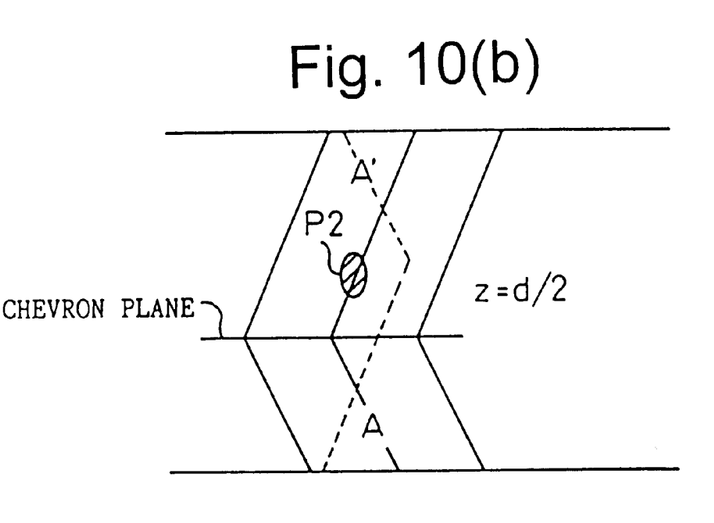

Next, the physical meaning when even-ordered harmonics appear will be considered. FIGS. 10(a) and 10(b) are diagrams showing cross sections of liquid crystal cells. FIG. 10(a) shows the case in which the chevron structure of the liquid crystal is formed at the position of z=½ d (d is the thickness of the liquid crystal cell). In the case of FIG. 10(a), when the cell is viewed at point z=½ d, indicated by an ellipse p1, by rotating it 180 degrees about the two-fold axis, no difference is observed in the structure before and after the rotation. That is, the cell does not look different when viewed from above than when viewed from below. In the case of such a layer structure, even-ordered harmonics do not appear.

On the other hand, in the case of FIG. 10(b), the chevron structure of the liquid crystal is not formed at the position of z=½ d. As a result, when the cell is viewed at point z=½ d, indicated by an ellipse p2, by rotating it 180 degrees about the two-fold axis, a difference occurs in the structure before and after the rotation. That is, when rotated, the bent structure of the cell changes from A to A' as shown in FIG. 10(b). In the case of such a layer structure, even-ordered harmonics appear.

Figure 11A:
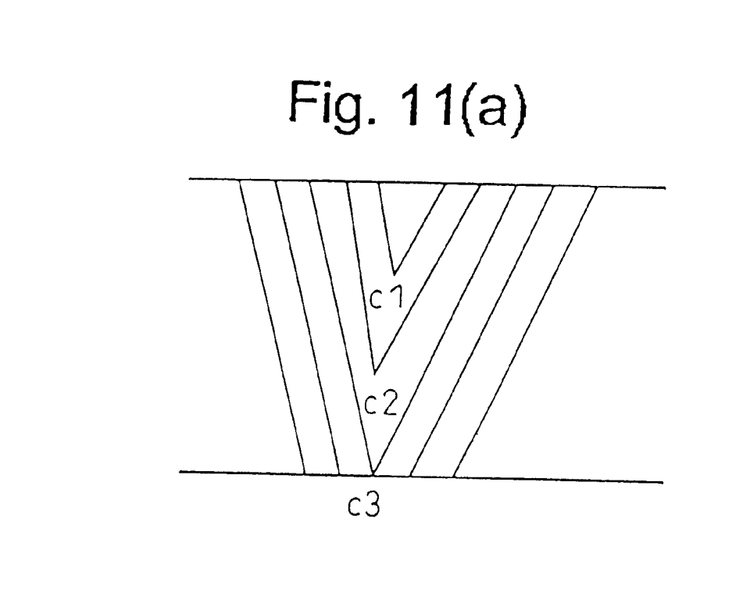
Figure 11B:
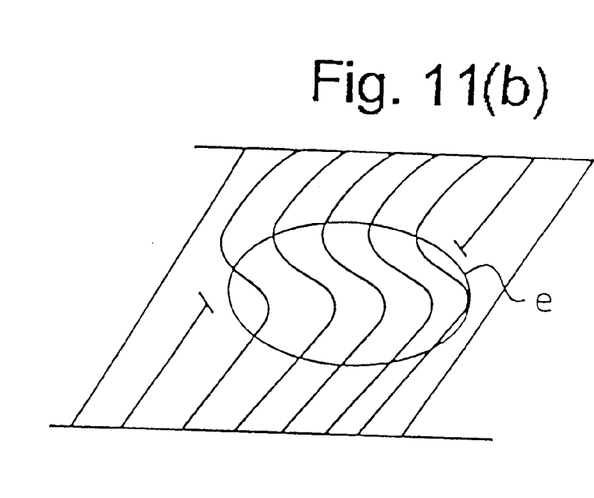

FIGS. 11(a) and (b) show other examples of the liquid crystal cell structure that allow even-ordered harmonics to appear. FIG. 11(a) shows the case in which the angles of the layers in the liquid crystal cell relative to the top and bottom substrates are different at different positions. Especially, in the case of the bent layer structure such as shown by c1, c2, and c3, disruption of the molecular alignment is induced over a considerably wide range in the bent regions. In FIG. 11(b), the layer structure in the portion indicated by an ellipse e is not bent but is curved. In such layer structures also, even-ordered harmonics resulting from the disruption of cell symmetry appear.

It was thus found that even-ordered components appeared when the liquid crystal cell changed to a structure of a complex and unrestricted shape as described above.

With a liquid crystal cell where even-ordered harmonics appeared in addition to odd-ordered harmonics, an AFLC panel was obtained that achieved higher contrast than with a liquid crystal cell where even-ordered harmonics did not appear.

Figure 12A:
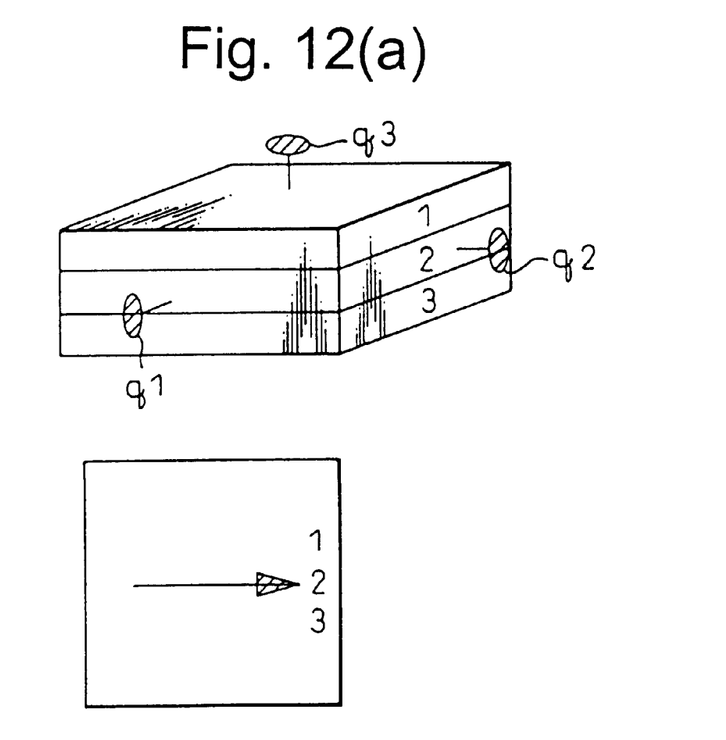

FIGS. 12(a) and (b) are diagrams showing laminated structures of optically anisotropic members. In the structures shown in FIGS. 10(a) and (b) and 11(a) and (b), the rotation about the axis perpendicular to the substrate was not considered. In practical cells, however, the rotation about the axis perpendicular to the substrate is induced, as described below. The fundamentals of laminated structures of optically anisotropic members are described in detail, for example, in "Polarization Microscopes" by Seitaro Tsuboi. The issue treated here is whether any optical differences occur when a plurality of optically anisotropic plates (three plates in the case of FIGS. 12(a) and (b)) are arranged one on top of another with their optical axes aligned with each other (the arrangement shown in FIG. 12(a)), as compared with the configuration in which they are arranged with their optical axes displaced (the arrangement shown in FIG. 12(b)). Since liquid crystal is essentially an optically anisotropic material, the following study is made by extending this discussion.

Figure 12B:
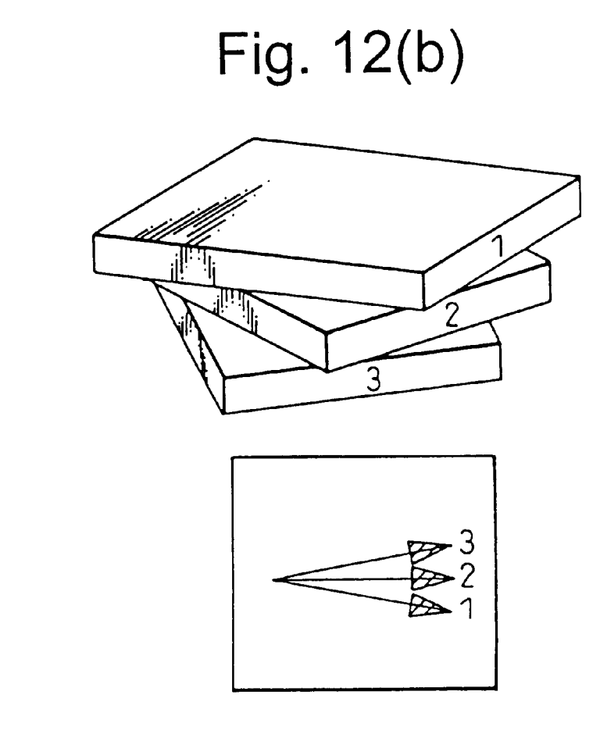

FIG. 12(a) is a diagram schematically illustrating the structure in which three optically anisotropic members 1, 2, and 3, for example, are arranged one on top of another with their optical axes aligned with each other. The upper part of the figure is a perspective view of the laminated layer structure with the aligned optical axes, and the lower part shows the orientation of the optical axes of the optically anisotropic members 1, 2, and 3 when the liquid crystal cell is viewed from above. On the other hand, FIG. 12(b) is a diagram schematically illustrating the laminated layer structure in which the optical axes of the optically anisotropic members 1 and 3 are rotated in opposite directions to each other with respect to the optically anisotropic member 2. The upper part of the figure is a perspective view of the laminated structure with the optical axes rotated in opposite directions, and the lower part shows the orientations of the optical axes of the optically anisotropic members 1, 2, and 3 when the liquid crystal cell is viewed from above.

In the case of the layer structure shown in FIG. 12(a), when the structure is rotated 180 degrees about any of the two-fold axes indicated by ellipses q1 and q2 at positions halfway across the cell or about the twofold axis, indicated by an ellipse q3, perpendicular to the substrate, no difference occurs in the layer structure before and after the rotation. In the case of the layer structure shown in FIG. 12(b), on the other hand, when the structure is rotated 180 degrees about any of the two-fold axes q1, q2, and q3, a difference occurs in the layer structure before and after the rotation. Of the layer structures shown in FIGS. 12(a) and (b), in the case of the layer structure with the aligned optical axes (FIG. 12(a)) only odd-ordered harmonics were observed, but in the case of the laminated layer structure with the rotated optical axes (FIG. 12(b)) even-ordered harmonics as well as odd-ordered harmonics were observed.

FIG. 12 shows the layered structures consisting of three optically anisotropic members, but the number of layers need not necessarily be limited to three.

As shown in FIGS. 10(b), 11(a), 11(b), and 12(b), even-ordered harmonics as well as odd-ordered harmonics are observed in the case of the liquid crystal cell with a rotated layer structure or a deformed layer structure. Next, a description will be given of the relationship between the optical path length and the range within which even-ordered harmonics appear.

Figure 13:
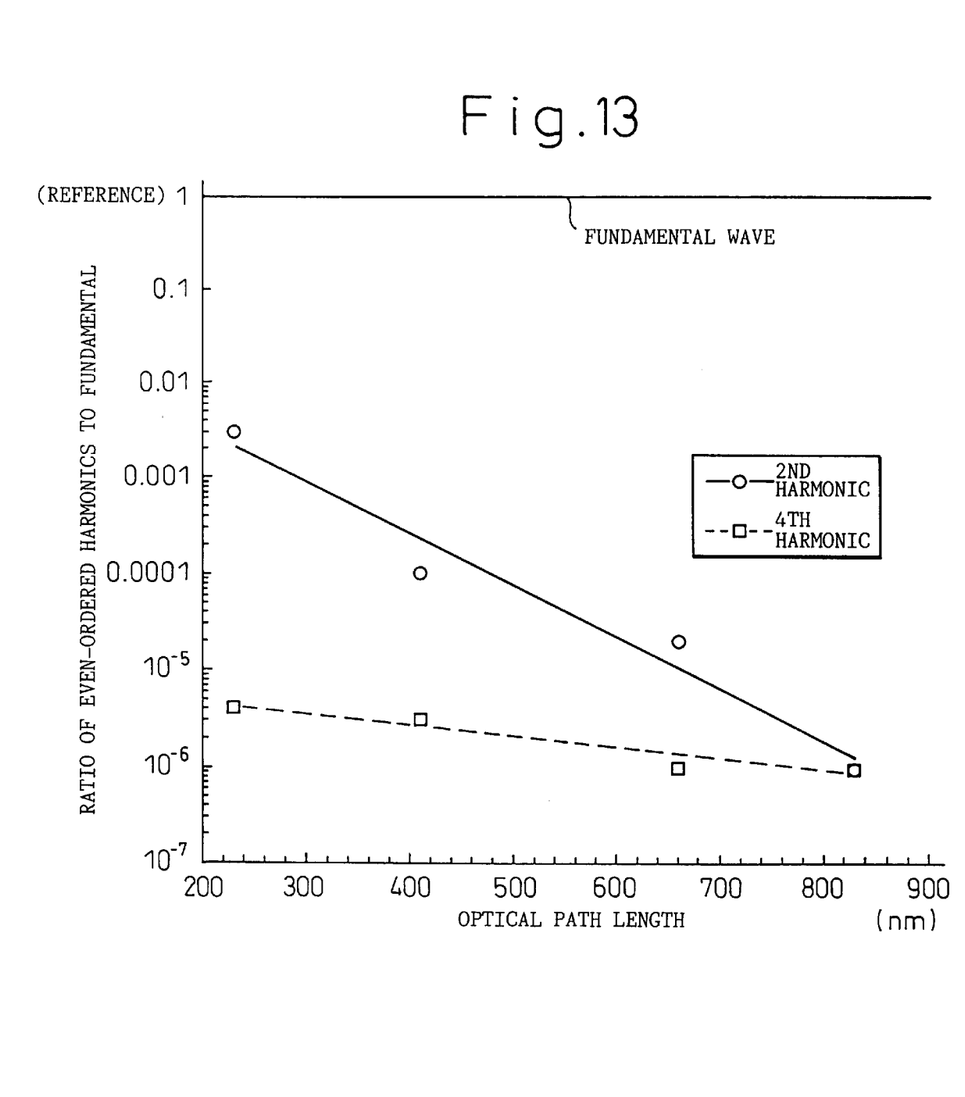
FIG. 13 is a graph showing the relationship between optical path length and even-ordered harmonics.

FIG. 13 is a graph showing the relationship between the optical path length and even-ordered harmonics. The optical path length is plotted along the horizontal axis, and the ratio of even-ordered harmonics (second and fourth harmonics are taken as examples) to the fundamental frequency component is plotted along the vertical axis. As can be seen from FIG. 13, even-ordered harmonics are observable in the range up to the optical path length of 800 nm, but when the optical path length exceeds 800 nm, the ratio drops below the order of $10^{-6}$, and the harmonic level becomes indistinguishable from noise in view of the measurement accuracy. It was also found that when the optical path length was longer than 800 nm, not only the even-ordered harmonics decreased, but color tinting occurred when a display was produced, and a higher voltage was required for driving.

Figure 14:
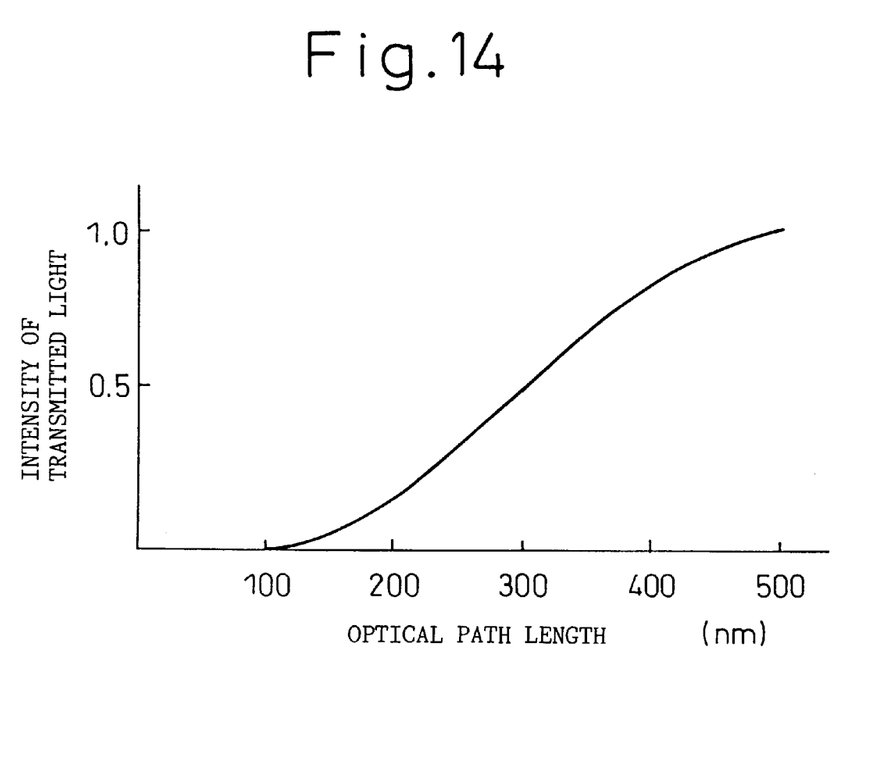
FIG. 14 is a graph showing the relationship between the optical path length of a liquid crystal cell and the intensity of transmitted light.

FIG. 14 is a graph showing the relationship between the optical path length and the intensity of light transmitted through the liquid crystal cell. As can be seen from the graph, the light and dark states of display become visually indiscernible when the optical path length is smaller than 100 nm. It was thus found that desirable results could be obtained by setting the optical path length of the liquid crystal cell within the range of 100 nm to 800 nm.

Next, the optical path length and the layer structure of the liquid crystal cell will be described. The optical path length $\Delta n \cdot d$ differs between the structure shown in FIG. 12(a) and the structure shown in FIG. 12(b). This is because the refractive index anisotropy $\Delta n$ of the structure shown in FIG. 12(b) is smaller than that of the structure shown in FIG. 12(a). When $\Delta n$ is small, the thickness of the liquid crystal cell can be made larger for the same optical path length. For example, in the case of a liquid crystal cell whose thickness d is 1 $\mu$m, if $\Delta n$ is small, the thickness of the liquid crystal cell can be increased, for example, to 1.5 $\mu$m. This facilitates the fabrication of liquid crystal cells. Stated another way, in the case of a liquid crystal cell with the layer structure that allows even-ordered harmonics to appear, i.e., the structure shown in FIG. 12(b) (as well as the layer structures of FIGS. 10(b), 11(a), and 11(b)), the thickness of the liquid crystal cell can be made larger for the same optical path length.

As described above, according to the antiferroelectric liquid crystal cell of the present invention, improved contrast can be achieved while retaining the fast response and wide viewing angle characteristics. Furthermore, since the thickness of the liquid crystal cell can be increased, the liquid crystal cell is easy to fabricate.

What is claimed is:

1. An antiferroelectric liquid crystal cell constructed with an antiferroelectric liquid crystal sandwiched between a pair of substrates, wherein said antiferroelectric liquid crystal cell has a layer structure such that when a sinusoidal voltage as a reference frequency is applied across said liquid crystal cell and the produced output signal is Fourier transformed, said transformed output voltage contains frequency components at odd and even multiples of said reference frequency, and wherein the optical path length of said liquid crystal cell lies in the range of 100 nm to 800 nm.

* * * * *